United States Patent [19]

Ardéchir et al.

[11] Patent Number: 5,302,430
[45] Date of Patent: Apr. 12, 1994

[54] POLYMERIC COMPOSITIONS WITH BARRIER PROPERTIES AND PACKAGING MATERIALS MADE FROM THESE COMPOSITIONS

[75] Inventors: Momtaz Ardéchir; Gauthy Fernand, both of Brussels; Churin Esteban, Ottignies; Michel Claude, Wavre, all of Belgium

[73] Assignee: Solvay (Soceite Anonyme), Brussels, Belgium

[21] Appl. No.: 816,250

[22] Filed: Jan. 3, 1992

[30] Foreign Application Priority Data

Jan. 8, 1991 [BE] Belgium .............................. 09100014

[51] Int. Cl.⁵ .................... B29D 22/00; B29D 23/00
[52] U.S. Cl. .................. 428/35.7; 428/35.1; 428/35.9; 428/35.8; 428/36.6; 252/186.24; 252/186.25; 252/186.33; 252/188.28; 252/383; 252/385; 525/371
[58] Field of Search ........... 428/35.7, 35.1, 35.9, 428/35.8, 36.6; 252/186.24, 186.25, 186.33, 188.28, 383, 385; 525/371

[56] References Cited

U.S. PATENT DOCUMENTS 5,021,515  6/1991  Cochran et al. .................... 525/371

FOREIGN PATENT DOCUMENTS 2341895  2/1974  Denmark .
1570609  5/1979  Denmark .
0092979  11/1983  European Pat. Off. .
0161625  11/1985  European Pat. Off. .
0186154  7/1986  European Pat. Off. .
0301719  2/1989  European Pat. Off. .
0361636  4/1990  European Pat. Off. .
48-20220  6/1973  Japan .
49-53945  5/1974  Japan .
53-125460  11/1978  Japan .
59-87132  5/1984  Japan .
1146157  3/1969  United Kingdom .

OTHER PUBLICATIONS

*Revue des Industries Agro–Alimentaires*, 9, pp. 34–35 (Apr. 23, 1990).
*La Recherche*, vol. 21, No. 222, p. 752 (Jun. 1990).

Primary Examiner—John Kight, III
Assistant Examiner—Duc Truong
Attorney, Agent, or Firm—Willian Brinks Hofer Gilson & Lione

[57] ABSTRACT

These compositions comprise a polyamide (PA) resulting from the polycondensation of an aliphatic $\alpha,\omega$-dicarboxylic acid with xylylenediamines and a salt of a metal chosen from the transition metals of group VIIIA of the Periodic Table of the elements, manganese, zinc and copper; the polyamide (PA) contains less than 150 ppm of phosphorus.

These compositions may be made into packaging materials, such as containers (bottles).

25 Claims, 1 Drawing Sheet

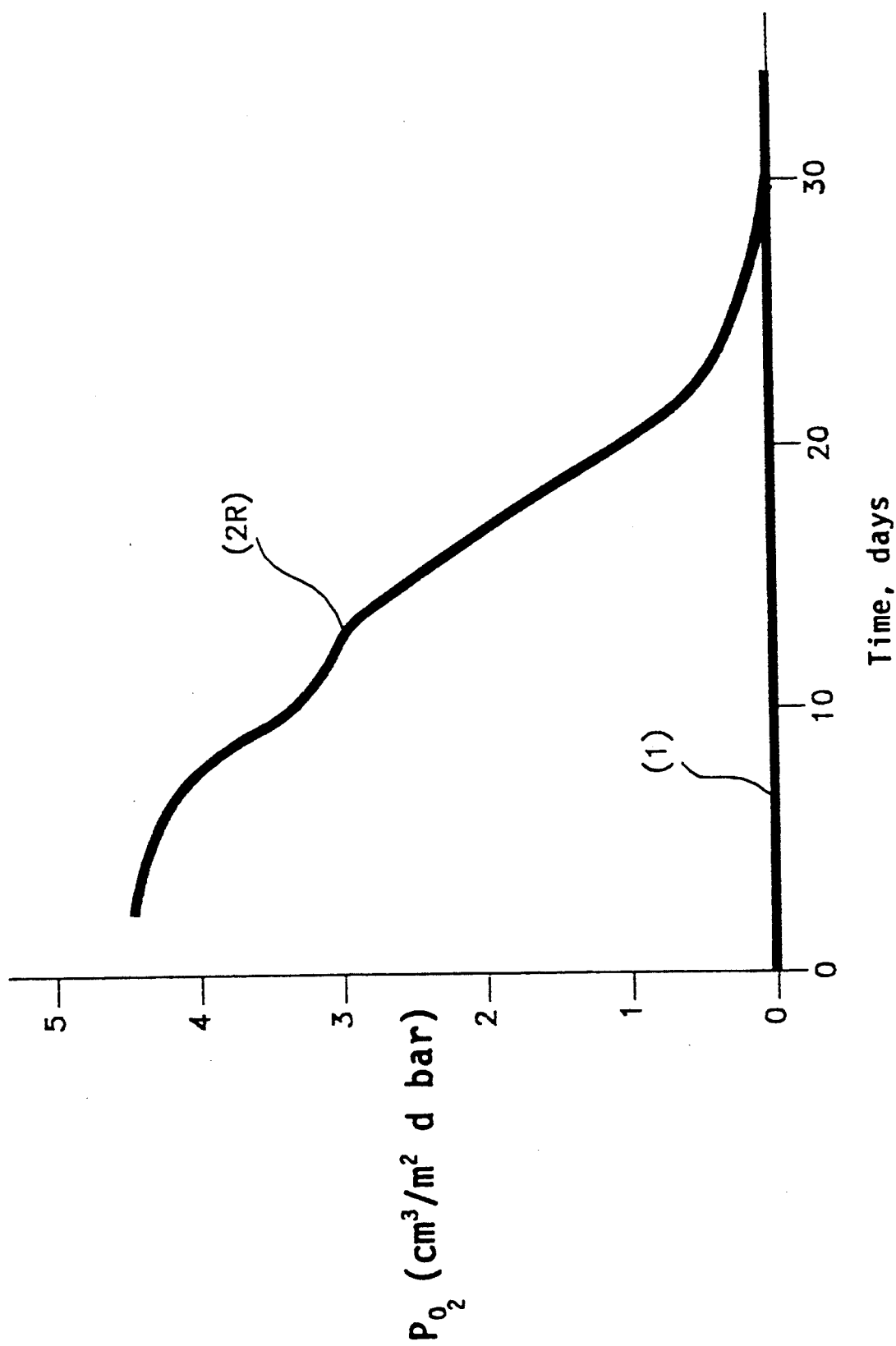

POLYMERIC COMPOSITIONS WITH BARRIER PROPERTIES AND PACKAGING MATERIALS MADE FROM THESE COMPOSITIONS

BACKGROUND OF THE INVENTION

1. Field of the Invention

The present invention relates to polymeric compositions with barrier properties, more particularly oxygen-impervious polymeric compositions containing semiaromatic polyamides. It also relates to packaging materials, especially for beverages and food products, made from these compositions.

2. Discussion of Technology

The use of polymers with barrier properties is at present practised on a vast scale in the manufacture of plastic packaging materials, chiefly for packaging beverages and foodstuffs.

Polymers which form a physical barrier to gases, especially to oxygen, and which therefore make it possible to lengthen the preservation and storage life of the packaged products without deterioration of the latter, are chiefly copolymers of ethylene and vinyl alcohol, vinylidene chloride copolymers and the polyamides resulting from the polycondensation of m-xylylenediamine with adipic acid (MXD6).

For cost reasons and/or for practical reasons (for example to impart other desired properties to the packaging material), it is often necessary to use these polymers in combination with other polymers such as, for example, ethylene, propylene and vinyl chloride polymers and polyalkylene terephthalates. These combinations are embodied in the presence, in the packaging material formed, of a plurality of layers of the chosen polymers with optional interposition of suitable adhesives. Typical structures of such materials in which the barrier polymer is MXD6 and the other polymer polyethylene terephthalate (PET) have been described, for example, in Patent Applications EP-A-0,161,625 and EP-A-0,186,154 (Mitsubishi Gas Chemical) and are particulary applicable to the manufacture of containers (bottles, flasks, etc.).

Containers of this type, in which an impervious layer consisting of a mixture of PET and of barrier polymer (MXD6) is interposed between two PET-based layers, especially to improve the adhesiveness between the layers after the biaxial orientation produced by the blow-moulding of the preformed parison, have been described in document EP-B-0,092,979 (Yoshino Kogyosho).

For reasons of cost and of final appearance of the packaging material, the MXD6 content of these mixtures is generally lower than 10% by weight.

To enable the MXD6 content to be decreased further while simultaneously improving the imperviousness to oxygen it has been proposed to incorporate into the MXD6 a carboxylate of a metal such as cobalt [Patent Application EP-A-0,301,719 (MB Group)]. It is assumed that the cobalt catalyses the oxidation of the MXD6, adding an effect of a "chemical barrier" to oxygen to the physical barrier consisting of the mixture of polymers (Revue des Industries Agro-Alimentaires, issue for 9 to 23 Apr. 1990, pages 34 and 35; La Recherche, volume 21, no. 222, June 1990, page 752).

This solution has not been found completely satisfactory because the MXD6 in which the cobalt carboxylate is incorporated contains phosphorus compounds. These compounds are incorporated during the polymerisation [see, for example, Patent Application DE-A-2,341,895 (Toyobo); Japanese Patent Applications (Kokai) published under numbers 74/53,945 (Toyobo) and 78/125,460 (Toyobo); Patent Application EP-A-0,361,636 (Amoco Corp.)] and/or added during the stabilisation of the MXD6 [see, for example, Patent Application DE-A-1,570,609 (Bayer AG); Patent GB-A-1,146,157 (Du Pont); Japanese Patent Application (Kokoku) published under number 73/20220 (Toyo Spinning); and Japanese Patent Application (Kokai) published under number 84/87,132 (Mitsubishi Chemical)]. These phosphorus compounds are generally chosen from (hypo)phosphorous, (hypo)phosphoric, phosphinic and phosphonic acids, their salts and esters and, in most cases, from sodium, manganese, calcium and zinc (hypo)phosphites. A phosphorus co pound which is frequently employed is sodium hypophosphite.

As a general rule, these phosphorus compounds can be found in MXD6, present in the abovementioned packaging materials, in concentrations which, expressed as phosphorus, can reach 500 ppm, in most cases between 150 and 400 ppm. For example, the product Reny 6001, which is the MXD6 typically employed for manufacturing the packaging materials according to Patent Application EP-A-0,301,719 (page 9, lines 10 to 13) contains 200 to 350 ppm of phosphorus.

This relatively plentiful presence of the phosphorus compound in the MXD6 is a source of disadvantages. It interferes with the "chemical barrier" function performed by the oxidation catalyst based on cobalt carboxylate, with the result that the latter, costly and ecologically dubious, has to be incorporated into the MXD6 in relatively large quantities. Furthermore, when the phosphorus compound is a reducing agent, as is frequently the case, and when the MXD6 is combined with PET to manufacture the packaging material, interfering reactions between the phosphorus compound and the catalyst residues from the polycondensation of PET (particularly organic antimony salts) give rise to discolorations in the packaging material which are particularly unacceptable in the case where articles intended for the packaging of liquids (sparkling beverages) are involved.

Finally, bearing in mind the antagonist effects exerted by the phosphorus compound and by the cobalt carboxylate on the oxidation of MXD6, a long delay, called an "induction period" hereinafter, may elapse between the time when the packaging material is manufactured and the time when its imperviousness to oxygen has reached an acceptable value. During this induction period, which may, for example, reach 30 days (Patent Application EP-A-0,301,719, page 8, lines 7 to 9), the initial oxygen permeability gradually decreases. This disadvantage is counteracted by costly (aging) techniques or by incorporating more oxidation catalyst (ibid., page 8, lines 2 to 7).

SUMMARY OF THE INVENTION

The present invention is aimed at providing polymeric compositions exhibiting good oxygen barrier properties without presenting the disadvantages referred to above. In another of its aspects, the invention is aimed at providing oxygen-impervious packaging materials made from these compositions.

The invention therefore relates chiefly to compositions comprising a polyamide (PA) resulting from the polycondensation of an aliphatic α,ω-dicarboxylic acid with xylylenediamines and a salt of a metal chosen from the transition metals of group VIIIA of the Periodic Table of the elements, manganese, zinc and copper, the polyamide (PA) containing less than 150 ppm of phosphorus.

BRIEF DESCRIPTION OF THE DRAWING

The FIGURE is a two dimensional diagram in which time is represented on the abscissa and oxygen permeability is represented on the ordinate.

DETAILED DESCRIPTION OF PREFERRED EMBODIMENTS

The polyamide (PA) present in the compositions according to the invention is synthesised in a known manner by a polycondensation reaction of xylylenediamine containing more than 60 mol % and, preferably, more than 90 mol % of the meta isomer of this diamine (any residue consisting of the para isomer), and of an aliphatic α,ω-dicarboxylic acid. This acid is generally an acid with a linear chain, containing from 6 to 12 carbon atoms, which can be represented by the formula $HOOC(CH_2)_nCOOH$ in which $4 \leq n \leq 10$. Examples of acids which can be employed are adipic, suberic, sebacic, undecanedioic and dodecanedioic acids. Adipic acid is preferred. The preferred polyamide within the scope of the present invention is obtained by a condensation reaction of m-xylylenediamine with adipic acid (MXD6).

The polyamide (PA) present in the compositions according to the invention must contain less than 150 ppm of phosphorus. To this end, the synthesis and/or the stabilisation of this PA are carried out in the substantial absence of the phosphorus compounds referred to above.

The terminology "substantial absence" implies not only the complete absence of the said compounds but also that these compounds may be absent during the synthesis of the PA and present in very small quantities during its stabilisation, or that they may be present in very low quantities during the synthesis of the PA and absent during its stabilisation, or that they may be present in very low quantities both during the synthesis and during the stabilisation of the PA, the essential criterion being that there should remain in the PA when it is incorporated in the compositions according to the invention only a concentration of less than 150 ppm, preferably less than 100 ppm, expressed as phosphorus.

The best results have been recorded with the lowest phosphorus concentrations in the said PA, that is to say concentrations below 50 ppm and even below the threshold of detectability of this element by colorimetry (approximately 5 ppm).

The compositions according to the invention also contain a salt of a metal (M) chosen from the transition metals of group VIIIA of the Periodic Table (version published in the Kirk-Othmer Encyclopedia of Chemical Technology, second completely revised edition, volume 8, page 94, Interscience Publishers 1965) and from manganese, zinc and copper. The transition metals may be chosen from periods 4, 5 and 6 of group VIIIA, namely, respectively, iron, cobalt and nickel, ruthenium, rhodium and palladium and osmium, iridium and platinum. These metals are generally present in the form of cations in a positive oxidation state which is lower than the maximum oxidation state. The preferred metals are cobalt and rhodium, the former being very particularly preferred. These metals are incorporated into the compositions according to the invention in the form of an inorganic or organic salt. Inorganic salts which are suitable because they are especially easy to acquire and apply are, for example, the halides, and organic salts which are suitable for the same reasons are, for example, the carboxylates of these metals. The incorporation of these salts into the compositions according to the invention can be carried out by any known means and especially by dry grinding, by melt-blending, for example in an extruder, or else by mixing the PA with a solution of the salt in an appropriate solvent under reflux.

The quantity of salt of metal (M) present in the compositions of the invention is expressed as a percentage by weight of metal relative to the PA present in these compositions. It is determined by the final content of metal (M) which it is desired to incorporate into the packaging material made from the composition (see below) and is generally lower than 2% and preferably than 0.5% by weight of metal (M) relative to the weight of PA.

The best results have been obtained in the case of metal (M) contents of between 0.01 and 0.2% by weight relative to the weight of PA.

In addition to the polyamide (PA) and the metal (M) salt, the compositions according to the invention may contain other constituents.

Among these other constituents there may be mentioned other polymers such as ethylene polymers, propylene polymers, vinyl chloride polymers and polyesters derived from a dicarboxylic acid and a diol. The polyesters derived from phthalic acid or anhydride as dicarboxylic acid and from an alkylene glycol, for example ethylene glycol as a diol, are suitable; among these polyesters preference is given to poly(ethylene terephthalate) (PET) resulting from the polycondensation of terephthalic acid (anhydride) and ethylene glycol, because this polymer is widely employed and well accepted as alimentary packaging material and because its barrier properties are advantageously complementary to those of the PA.

In the particular case of PET as "other polymer", the metal (M) may be present therein, in appropriate quantities, as a catalyst residue, especially when cobalt is involved. The said PET can then itself constitute the (only) source of metal (M) in the compositions of the invention.

The content of these possible "other polymers" in the compositions according to the invention can vary to a wide extent, especially as a function of the use of the packaging material manufactured with their participation, the barrier properties which it is intended to impart to the latter material, the period of preservation of its contents, economic factors, and the like.

This "other polymer" content of the compositions may be expressed as the ratio of their weight to the weight of PA present in the compositions. This ratio may in most cases range from 5/100 to 100/1, preferably from 50/100 to 50/1.

The best results have been obtained with compositions consisting essentially of a mixture of PET (as "other polymer") and of PA, in respective weight ratios of between 5/1 and 35/1, most particularly between 15/1 and 30/1, these compositions additionally containing the abovementioned quantities of cobalt as metal (M).

The incorporation of the "other polymer" into the compositions can be carried out by any known means such as, for example, dry blending, cogrinding, extrusion, and the like. When the "other polymer" is present in excess in relation to the PA constituting the compositions, it may be recommendable to incorporate the PA already containing the metal (M) salt, by the conventional technique known as that of the "masterbatch".

The compositions according to the invention may also contain, generally in quantities of less than 10% of their total weight, other conventional ingredients such as stabilisers, phosphorus-free polyamides, stabilisers, optional other polymers, pigments, colorants, fillers, and the like.

In another of its aspects, the invention relates to packaging materials made from the compositions described above.

Nonlimiting examples of packaging materials made from these compositions are:
 sheets and films;
 containers: bottles, flasks, boxes;
 bags and sachets.

These materials may be of monolayer structure or multilayer structure. They can be made by moulding the compositions described above using any known techniques: injection moulding, blow-moulding followed by drawing, extrusion moulding, extrusion blow-moulding, and thermoforming.

In the case where it is desired to manufacture a material of multilayer structure the coextrusion, coinjection or lamination techniques can be employed. Finally, the preformed sheets and films themselves can be converted into containers by heating with drawing and converted into bags by drawing followed by heat-sealing.

The composite packaging materials of multilayer structure according to the invention comprise at least one layer (A) consisting of the compositions described above and at least one other layer (B) consisting of a thermoplastic polymer chosen from the "other polymers" referred to above in connection with the compositions according to the invention and from polycarbonates and aliphatic polyamides. A preferred thermoplastic polymer is PET.

The bond between the constituent layers of these composite packaging materials may be reinforced by the interposition of layers (C) based on adhesive resins (adhesive layers).

Resins which are known to be employed for this purpose are, for example: polyolefins modified with polar monomers, such as propylene polymers and ethylene polymers grafted with maleic anhydride, copolymers of ethylene with vinyl acetate and copolymers of ethylene with acrylic acid, or ionomers derived from alkali or alkaline-earth metal salts and from a copolymer of ethylene with acrylic acid or with acrylates.

By way of examples of composite packaging materials of multilayer structure there may be mentioned:
 two-layer materials in which one layer consists of compositions according to the invention [layer (A)] and in which the other layer consists of a thermoplastic polymer such as defined above [layer (B)];
 three-layer materials in which a layer based on adhesive resins [layer (C)] is interposed between the layers (A) and (B);
 three-layer materials (M1) in which a layer (A) is interposed between two layers (B);
 three-layer materials (M2) in which a layer (B) is interposed between two layers (A);
 five-layer materials (M3) in which three layers (B) and two layers (A) alternate in succession;
 five-layer materials in which the layers (A) and (B) of the three-layer materials (M1) and (M2) are separated respectively from each other by layers (C);
 nine-layer materials in which the alternate layers (A) and (B) of the materials (M3) are separated from each other by layers (C).

Whether the packaging materials according to the invention are of monolayer structure (which obviously constitutes the most economical solution) or of multilayer structure, the thickness of the constituent layer(s) (A) may vary approximately from 20 to 200 microns ($\mu$m), in the case of the most flexible ones such as sheets and films, and approximately from 200 to 1200 microns in the case of the most rigid ones (structures which are self-supporting when empty, such as bottles, flasks, containers, etc.).

By virtue of the invention it is possible to make packaging materials in which the layer (A) contains only an extremely small quantity of metal (M). This quantity is generally less than 50 ppm, that is to say lower than those conventionally found in a material of this type (Patent Application EP-A-0,301,719, page 6, lines 26 to 28; page 10, Table 1; page 16, Table 3). This quantity is preferably less than 40 ppm. Excellent results have even been found in the case of metal (M) contents of the layer (A) of less than 30 ppm.

The following examples are used to illustrate the invention with reference to the attached single FIGURE. This FIGURE is a two-dimensional diagram in which the time, expressed in days, is represented as the abscissa and in which the oxygen permeability ($P_{O_2}$), expressed in cm$^3$ O$_2$/m$^2$ day bar (cm$^3$ O$_2$/m$^2$ d bar), is represented as the ordinate. The curves (1) and (2R) are representative, respectively, of the $P_{O_2}$ values of flasks made according to Examples 1 and 2R.

Example 1

1. Preparation of a masterbatch from MXD6 and cobalt neodecanoate

The following are blended for 30 minutes in a barrel mixer:
an MXD6 polyamide obtained by condensation reaction of m-xylylenediamine and adipic acid without addition of sodium hypophosphite, with a relative viscosity (measured on 100 ml of a solution of 95% sulphuric acid containing 1 g of polymer) of 1.47; this polyamide is dried in a vacuum of 700 mm of mercury for 18 hours at 135° C.;
cobalt neodecanoate marketed by Shepherd in the form of tablets containing 20.5% by weight of cobalt, these being ground to obtain a fine powder.

To produce the example, the mixture contains 99.75% by weight of MXD6 and 0.25% by weight of cobalt neodecanoate (mixture 1).

2. Granulation of the mixture

The mixture is extruded without any phosphorus-containing process stabiliser, at a rate of 3 kg per hour, in a Troester EP 30 extruder the screw of which rotates at 55 revolutions/minute. The temperature of the stock leaving the extruder is 270° C. The extruded reed is cooled on a conveyor belt and granulated.

3. Preparation of the final polymeric composition

Mixture 1 is incorporated into polyethylene terephthalate (PET) marketed under the name Polyclear T 86 by Hoechst (containing no cobalt), in a proportion of 5% by weight in PET.

4. Moulding of a packaging material

After drying, the granules obtained are introduced into a Nissei ASB 50 MH injection blow-moulding machine, where they are melted and injection-moulded to obtain a preform at 270° C. in the compression and injection zone. The mould is cooled with water at 10° C. and an amorphous preform is obtained. After heat-conditioning of the preform at more or less 95° C., the preform is biaxially oriented by blow-moulding in a mould cooled to 10° C.

The volume of the flask obtained is 1.5 l and the wall thickness approximately 300 μm.

The oxygen permeability ($P_{O_2}$) of the flask is measured in an Oxtran apparatus manufactured by Mocon (U.S.A.) at 25° C. (relative humidities 0% inside the flask and 50% outside).

The permeability value, expressed in cm$^3$ O$_2$/m$^2$ day bar is given in the Table below, in which other characteristic data of the examples are brought together.

Curve (1) (see FIGURE) shows that this $P_{O_2}$ is constant and is obtained as soon as the flask is moulded, without any induction period.

5. Examination of the optical properties of the flask

The optical properties of the flask made from the composition of the example were also examined, more precisely the properties representative of its transparency, namely:

the total transmission (T) measured according to ASTM Standard D 1003 and expressed in %;

the haze (H) measured according to ASTM Standard D 1003 and also expressed in %.

The following values were measured:
% T: 88
% H: 8

Example 2R

This example is provided by way of comparison.

A "final polymeric composition" is prepared as shown under points 1 to 3 of Example 1, except that the MXD6 employed is the product marketed under the name Reny 6001 by Mitsubishi Gas Chemical, containing 260 ppm of phosphorus (P) and that 97.5% by weight of this MXD6 are mixed with 2.5% by weight of cobalt neodecanoate (mixture 2).

A flask is moulded from this composition as indicated under point 4 of Example 1. The $P_{O_2}$ measured after 180 days is of the same order as the $P_{O_2}$ of the flask moulded from the composition of Example 1, but only after 30 days' induction period (see FIGURE) and in the case of a cobalt content which is approximately 10 times higher (see Table below).

The optical properties of the flask thus moulded were examined as explained under point 5 of Example 1. The following values were measured:
% T: 79
% H: 15

The total transmission and the haze are therefore inferior and superior, respectively, to those measured on the flask of Example 1 and the optical properties of the flask of Example 2R are therefore less good than those of the flask of Example 1.

TABLE

| Example | | 1 | 2R |
|---|---|---|---|
| Mixture | | | 2 |
| Final composition | PET (wt %) | 95 | 95 |
| | MXD6 (wt %) | 5 | 5 |
| | Co (ppm) | 25 | 240 |
| | P (ppm) | — | 260 |
| $P_{O_2}$ | | <0.05 | <0.05 |

TABLE -continued

| Example | 1 | 2R |
|---|---|---|
| (after 180 days) | | |

We claim:

1. A composition comprising:
   (1) a polyamide (PA), containing less than 150 ppm of phosphorus, produced by the polycondensation of an aliphatic α,ω-dicarboxylic acid with xylylenediamine; and
   (2) a salt of a metal (M) selected from the group consisting of salts of the transition metals of Group VIIIA of the Periodic Table of the Elements, manganese, zinc and copper.

2. A composition according to claim 1, wherein the polyamide (PA) contains less than 50 ppm of phosphorus.

3. A composition according to claim 1, wherein the phosphorus content of the polyamide (PA) is below the threshold of detectability by colorimetry.

4. A composition according to claim 1, wherein the polyamide (PA) results from the condensation reaction of m-xylylenediamine with adipic acid.

5. A composition according to claims 1, 2, 3 or 4, wherein the metal (M) is cobalt.

6. A composition according to claim 5, wherein the metal (M) salt is a cobalt carboxylate.

7. A composition according to claim 6, comprising the metal in the amount of less than 0.5% by weight relative to the weight of the polyamide (PA).

8. A composition according to claim 1, wherein said compositions additionally comprises another polymer chosen from polyesters derived from a dicarboxylic acid and from a diol.

9. A composition according to claim 8, wherein the ratio of the weight of the other polymer to the weight of polyamide (PA) is between 5/1 and 35/1.

10. A packaging material made from the composition according to claim 1.

11. A packaging material according to claim 10 of monolayer structure.

12. A packaging material according to claim 10 of multilayer structure in which at least one layer is based on a composition according to claim 1.

13. A packaging material according to claim 10, made in the form of a container, such as a bottle.

14. A packaging material according to claim 10, wherein the layer based on the composition according to claims 2, 3, 4, 6, 7, 8 or 9 contains less than 50 ppm of metal (M).

15. A packaging material comprising at least one layer based on a composition comprising approximately 5% by weight of a polyamide containing less than 150 ppm of phosphorus and resulting form the condensation reaction of m-xylylenediamine with adipic acid and approximately 95% by weight of poly(ethylene terephthalate), the said layer containing less than 50 ppm of cobalt, having a thickness of 200 to 1200 microns and an oxygen permeability which is constant and lower than 0.05 cm$^3$ of oxygen/m$^2$ day bar for at least the first 180 days which follow the making of the material.

16. A composition according to claim 8, wherein said other polymer is polyethylene terephthalate.

17. A composition according to claim 16, wherein substantially all of said salt of said metal present in said composition is in said polyethylene terephthalate.

18. A composition according to claim 1, further comprising at least one polymer chosen from the group consisting of ethylene polymers, propylene polymers and vinyl chloride polymers.

19. A composition according to claim 1, wherein said polyamide comprises less than 5 ppm of phosphorus.

20. A composition according to claim 1 which comprise less than 2% by weight of the metal relative to the weight of the polyamide.

21. A composition according to claim 1 which comprise between 0.01 and 0.2% by weight of the metal relative to the weight of the polyamide.

22. A composition according to claim 1, wherein the xylylenediamine comprises more than 60 mol % of the metal isomer.

23. A composition according to claim 1, wherein the xylylenediamine comprises more than 90 mol % of the metal isomer.

24. A composition according to claim 1, wherein the polyamide contains less than 100 ppm of phosphorus.

25. A composition according to claim 1, wherein the polyamide is produced in the substantial absence of phosphorus compounds.

* * * * *